United States Patent [19]

Pearce et al.

[11] Patent Number: 4,781,517
[45] Date of Patent: Nov. 1, 1988

[54] ROBOTIC AUTOMOBILE ASSEMBLY

[75] Inventors: Craig S. Pearce; Clayton V. Pearce, both of Windsor, Canada; Carl Utz, Novi, Mich.

[73] Assignee: Clay-Mill Technical Systems, Inc., Windsor, Canada

[21] Appl. No.: 825,752

[22] Filed: Feb. 3, 1986

[51] Int. Cl.⁴ .............................................. B66F 1/00
[52] U.S. Cl. ................................... 414/590; 414/749; 104/167; 212/210; 901/16; 901/21; 901/25
[58] Field of Search ....................... 901/16, 21, 23, 25, 901/47, 7, 29; 212/210; 414/589, 590, 749, 751, 752, 753; 104/167; 74/425

[56] References Cited

U.S. PATENT DOCUMENTS

| 528,619 | 11/1894 | Shaw | 212/210 |
|---|---|---|---|
| 944,054 | 12/1909 | Sawyer | 212/210 |
| 1,122,000 | 12/1914 | Von Hassel | 104/167 |
| 3,300,058 | 1/1967 | Wilson | 212/210 X |
| 3,481,499 | 12/1969 | Pierson et al. | 901/21 X |
| 3,884,363 | 5/1975 | Ajlouny | 901/16 X |
| 4,105,925 | 8/1978 | Rossol et al. | 901/7 X |
| 4,288,020 | 9/1981 | Searles et al. | 901/16 X |
| 4,466,770 | 8/1984 | Peroutky | 414/751 |
| 4,575,802 | 3/1986 | Walsh et al. | 901/47 X |
| 4,610,592 | 9/1986 | Pienta | 414/80 X |
| 4,615,615 | 10/1986 | Krolak et al. | 901/47 X |

FOREIGN PATENT DOCUMENTS

| 0268257 | 12/1913 | Fed. Rep. of Germany . |
|---|---|---|
| 3504233 | 11/1986 | Fed. Rep. of Germany . |
| 0211096 | 7/1984 | German Democratic Rep. . |
| 52-59475 | 5/1977 | Japan . |
| 52-71054 | 6/1977 | Japan . |
| 53-36809 | 4/1978 | Japan . |
| 2120202 | 11/1983 | United Kingdom . |

Primary Examiner—Robert J. Spar
Assistant Examiner—Jennifer L. Doyle
Attorney, Agent, or Firm—Cushman, Darby & Cushman

[57] ABSTRACT

A new robotic system is provided in which the robotic tool is mounted for movement on a gantry above the work piece upon which the work is to be performed. The tool is supported on two carriages each of which is movable with respect to each other and with respect to the gantry so that the tool has the capacity to move through five degrees of freedom and permit a more accurate response to a sensing system which determines the position of the work piece relative to a master and then moves the tool to a working position in substantial operational compliance with the master position.

10 Claims, 18 Drawing Sheets

ROBOTIC AUTOMOBILE ASSEMBLY

BACKGROUND OF THE INVENTION

The present invention relates to robotic systems for the assembly of components particularly in the automotive industry and to various components for use in such robotic systems.

It is well-established that when the cost of labour exceeds a minimum threshold or where a high degree of accuracy and quality are required in the final product, the use of robotic assembly systems instead of human labour may be justified. This emphasis on the use of robotics is nowhere more evident than in the automotive industry.

However, up to the present time the mechanisms available have had limited accuracy, limited versatility and limited capacity.

The normal manner of assembly the various components of an automobile body by robotic means has been to provide a transport mechanism which conveys the automobile along a line, and at various discrete stations, the several components such as doors, are brought and secured to the frame. In these prior mechanisms there has been virtually no accommodation of any misalignment of the vehicle along the axis of transportation. As a consequence the piercing, mounting and securing of components had not been accurate.

The limitation in accuracy has also led to a limitation in the utility of the system because those components which have to be mounted with a greater degree of accuracy have had to be mounted manually.

As mentioned previously, there has been a limitation in the capacity of these prior machines. In this sense by capacity is meant the weight capacity. The upper range of weights of the components which have been carried and manoeuvred by prior robotic arms has been limited because any arm which has the requisite axes of motion has not had the carrying capacity.

SUMMARY OF THE INVENTION

With these limitations in mind and with the present demands of the industry, it is the object of the present invention to provide a robotic system for assembling components on a body such that the components may be carried to and fastened upon the frame or body within an accuracy of one thousandth of an inch.

It is a further object of the present invention to provide a robotic arm which is capable of movement through at least four axes and with a carrying capacity of at least a thousand pounds.

There is accordingly provided in accordance with the present invention for
  use in a robotic assembly system, means for moving a tool mount through five axes, said means comprising: first
  motor means operably connected to said tool mount to rotate said mount about a first axis;
  second motor means operably connected to said tool mount to rotate said mount about a second axis normal to said first axis;
  third motor means for moving said tool mount along a third axis normal to said first and second axes.
  a first movable carriage, said first, second means and third motor means and said tool mount being carried thereon;
  a second movable carriage, said first carriage being carried on said second carriage and movable relative thereto;
  means for moving said first carriage relative to said second carriage along a third axis inclined to said first and second axis;
  second carriage support means for supporting said second carriage, and second carriage motor means operably connected to said second carriage to move said second carriage along a fifth axis, said fifth axis being inclined to each of said remaining axes.

There is also provided a robotic system for moving and assembling components in which the robotic mechanisms are mounted on gantries above the work piece and which are movable through five axes relative to the work piece to effect work upon the work piece.

These features and others will be more apparent from the drawings and description which follow in which a preferred embodiment is described by way of example:

DESCRIPTION OF THE DRAWINGS

As illustrated in FIG. 1 a robotic assembly system in accordance with the present invention may comprise a plurality of stations such as 10, 11 and 12 at which discrete operations are carried out on an automobile body. By way of example station 10 constitutes a piercing station and stations 11 and 12 are door mounting stations.

Figure 1:
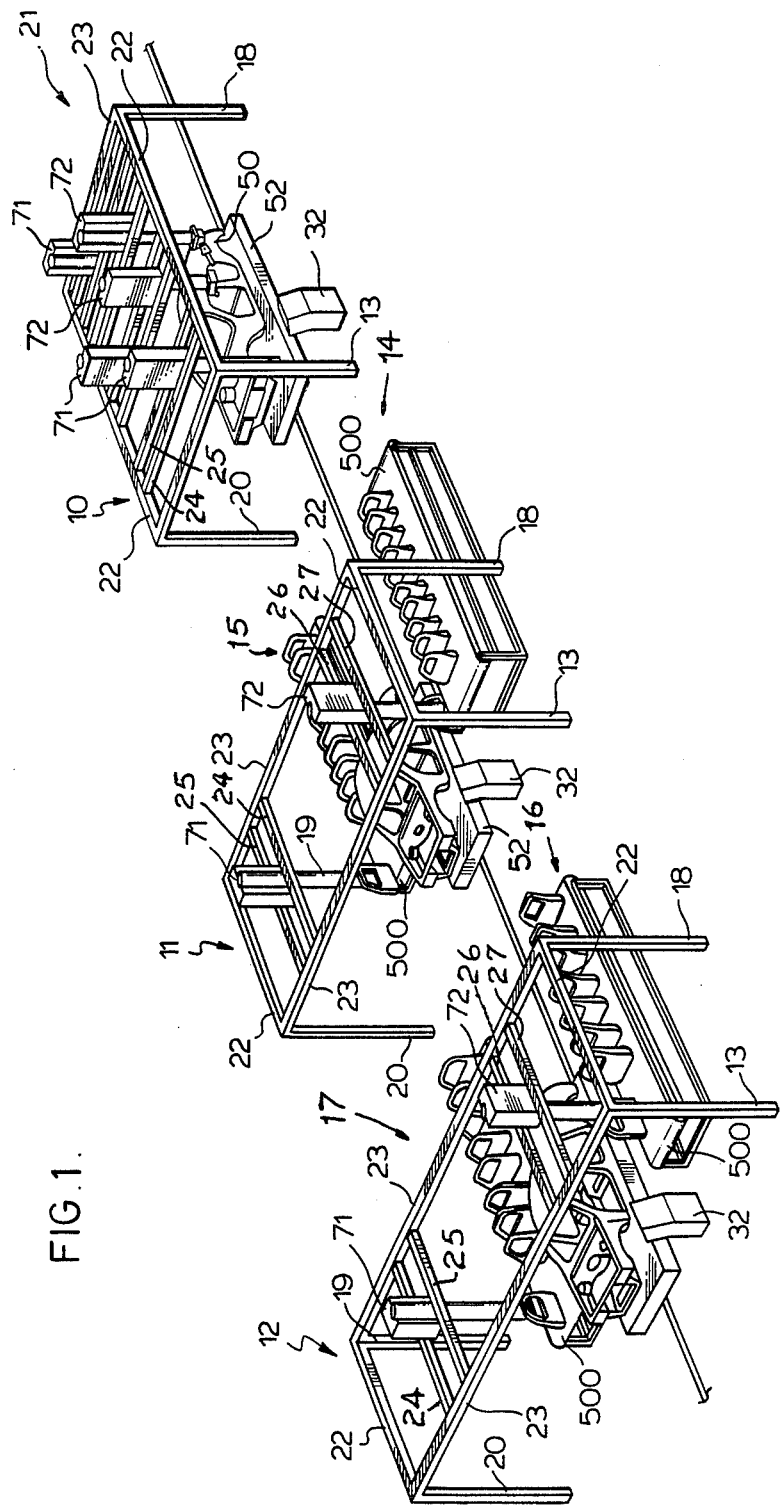
FIG. 1 is a general perspective schematic view of a robotic assembly system in accordance with one embodiment of the present invention.

It will also be apparent from the following description that according to the tools employed a plurality of operations may also be carried out at one station.

Stations 11 and 12 are substantially similar to station 10 except that the tools employed are adapted to the carriage and securing of the doors and these latter stations are provided with accumulators or component supply systems as at 14, 15, 16 and 17.

Station 10 comprises four vertical posts which are indicated at 13, 18, 19 and 20 and these posts support a frame 21 with lateral members 22 and transverse members 23. Between lateral members 2 bridge members such as 24, 25, 26 and 27 are mounted. These bridge members carry the robot carriages indicated at 71 and 72 in FIG. 2.

Figure 2:
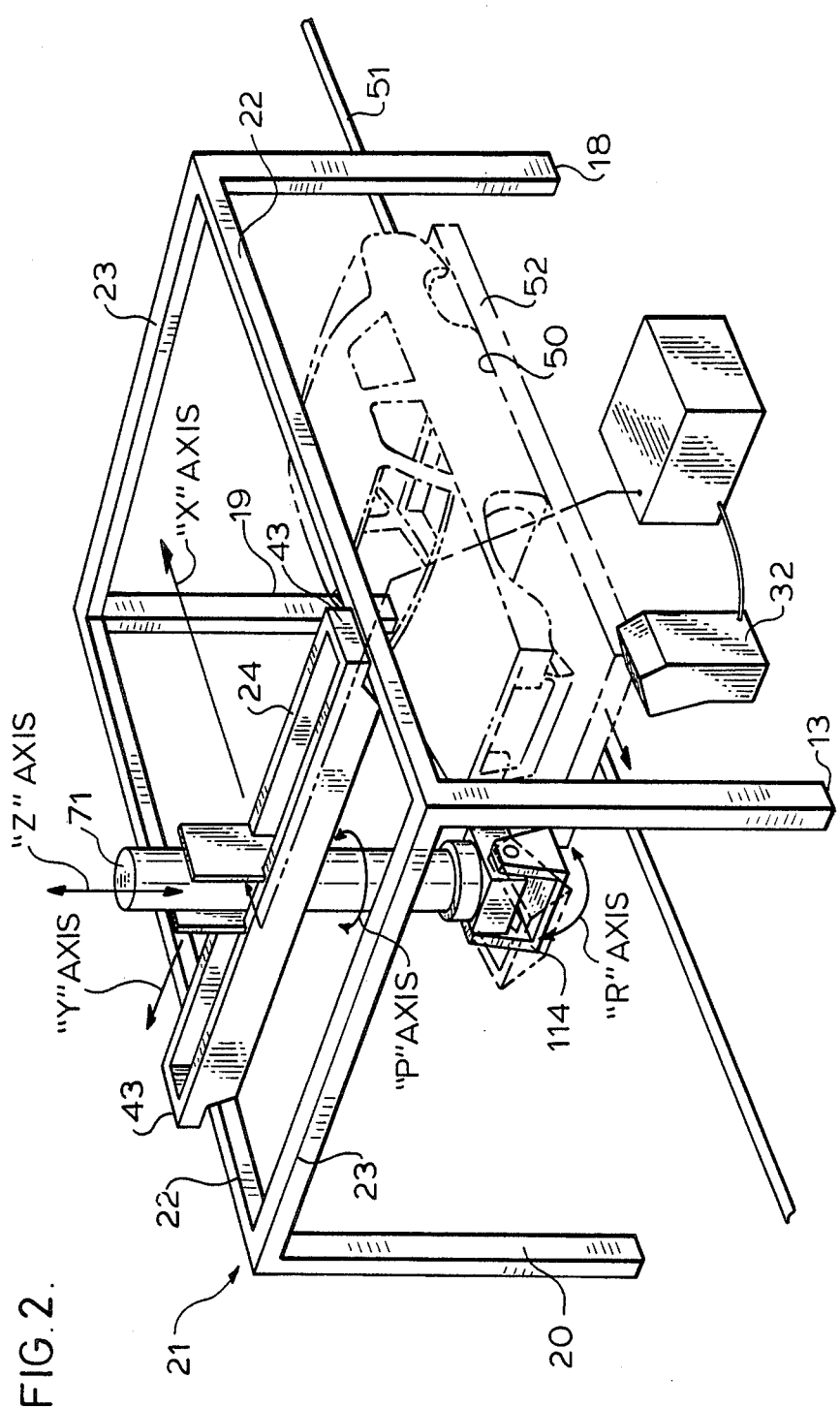
FIG. 2 is a general schematic view of one station with one robot head on a carriage and serves to illutrative the relative movements of the robot head made available by the present invention.

FIG. 2 is a general schematic view of one robotic station which for simplicity has one robot member 71 and one vision system indicated at 32.

As illustrated a typical robot member in accordance with the present invention has the capacity to move or be moved in the direction of each of the arrows, ie. along the plane of the frame 21; transversely cross the frame 21; about the vertical axis of the robot member 71; and lower tool attachment member 113 (see FIG. 8) may be moved about a horizontal axis normal to the vertical axis of robot member 30.

For convenience in this application these axes will be referred to, respectively, as the "X" axis; the "Y" axis; the "Z" axis; the "P" axis; and the "R" axis.

The automobile upon which the work is to be done is indicated in dotted outline at 50 and moves under the frame 21 on a carriage 52 along a carriage track 51.

The bridges such as 24 comprise a pair of spaced apart members 41 and 42 which are connected by bridge ends such as 43 and 44.

Figure 3:
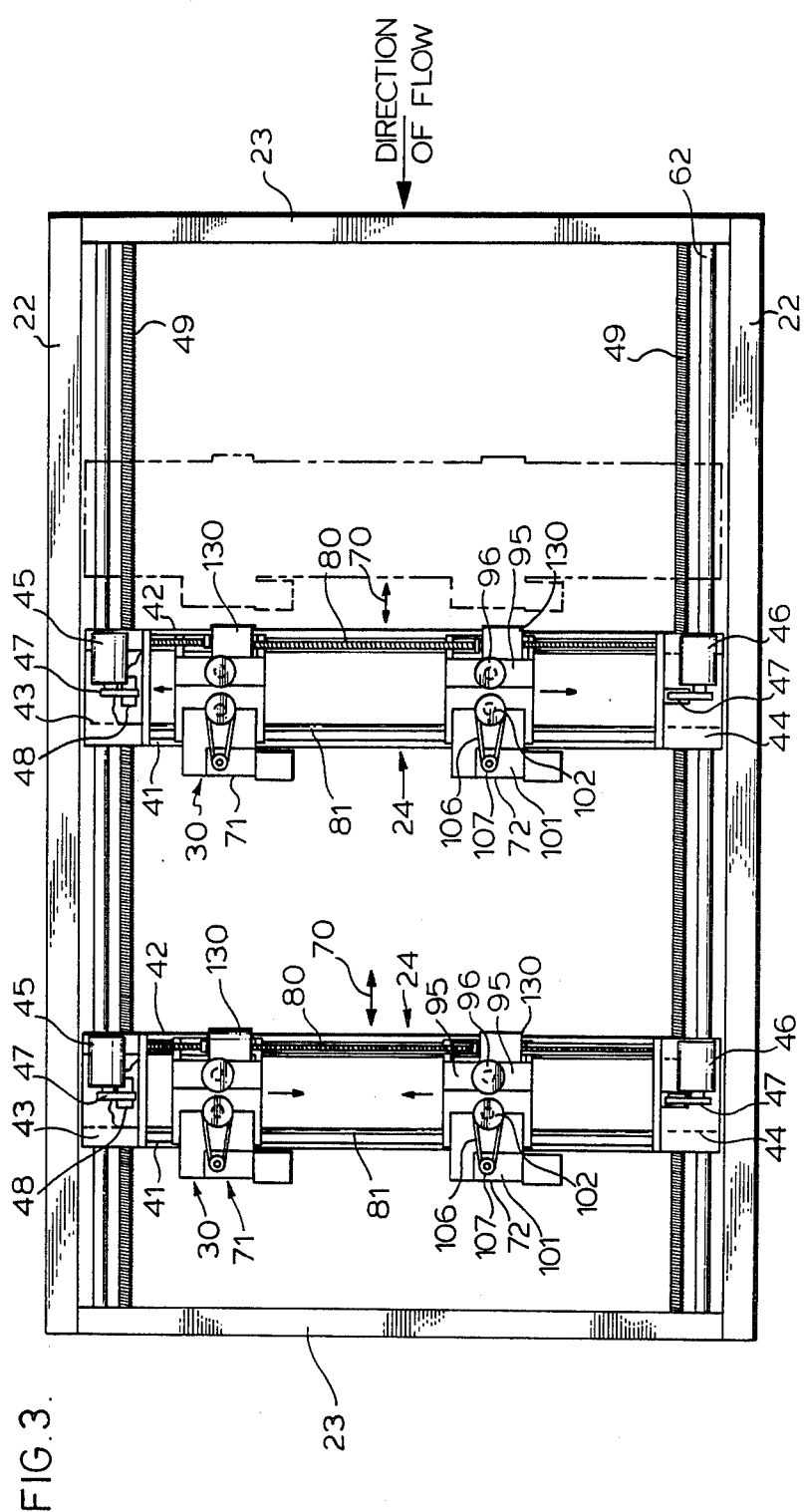
FIG. 3 is a schematic plan view of a robotic work station in accordance with the present invention and serves to illustrate certain of the relative motions available with the present invention.

On the bridge ends, motors such as 45 and 46 are mounted, and these motors are connected through a chain drive 47 and a ball nut assembly 48, shown in the breakaway in FIG. 3, which engages with a ball screw 49. Members 41 and 42 are supported by brackets such as 60 and 61 and shaft 62. Rod 62 is further supported by bearings 63 and 64 and bridge 24 is movable along rod 62. It will be understood that required suitable bearings and supports will be provided in accordance with approved engineering practice.

It will also be understood that each pair of motors 45 and 46 operate synchronously so that they move together and on operation of these motors through the engagement of the ball nuts and ball screws the bridges 24 will move along the frame 21 as indicated by the arrows, 70. The ball screw and ball nut engagement permits each of the carriages on each frame to be moved independently of the other and to permit the movements to be extremely fine, ie. of the order of thousandths of an inch. This almost infinite adjustment provided by the ball screw drive is a factor in accommodating the fine adjustment required of the robot tool heads. It will be apparent that it is the driving of the ball nut assembly which permits the independent movement of each of the carriages.

On the bridges 24 are carried robot carriages such as 71 and 72. As will be apparent from FIGS. 1 and 3 more than one robot carriage may be mounted on each bridges and each of these robot carriages 71 and 72 is movable independently of the other through the driving of the ball nut.

Between bridge ends 43 and 44 a further ball screw 80 and a further guide rod 81 are mounted with suitable brackets and bearings.

Figure 8:
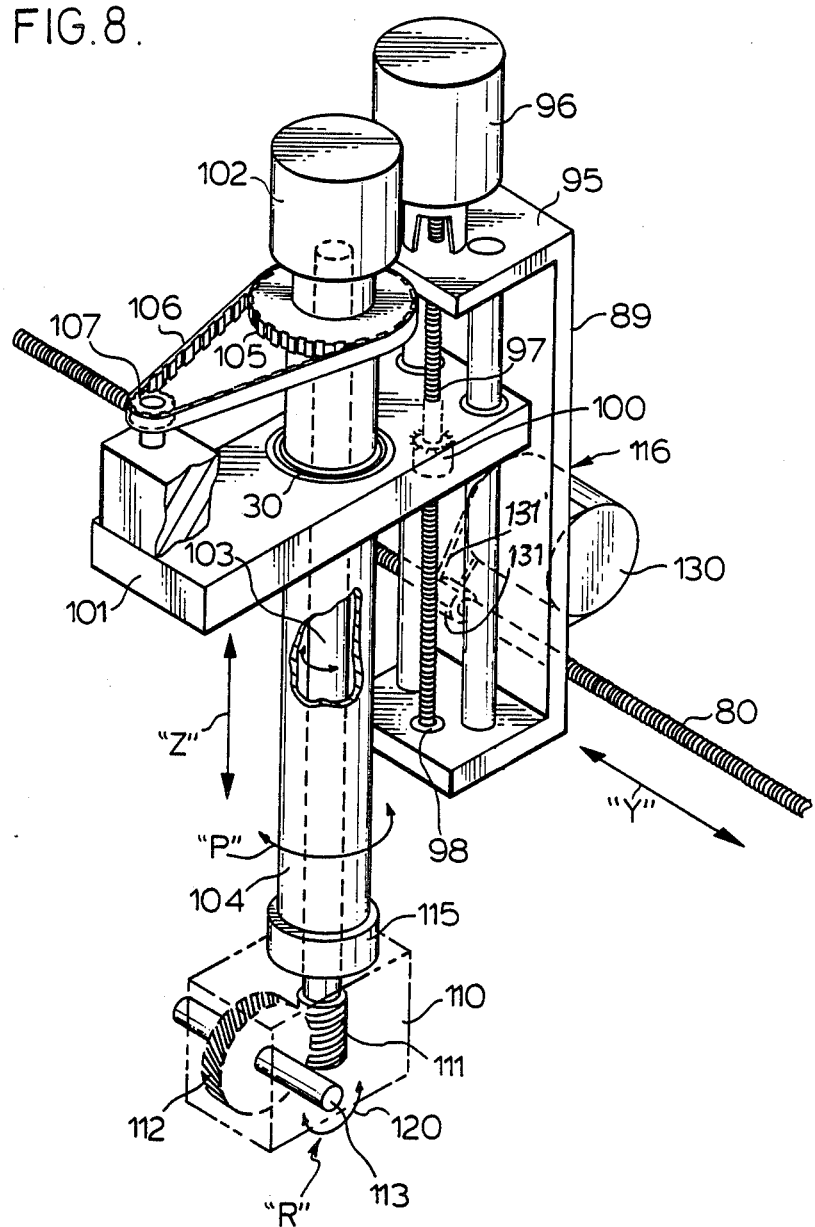
FIG. 8 is a general schematic perspective view partially in section of a robot carriage unit in accordance with the present invention.
Figure 9:
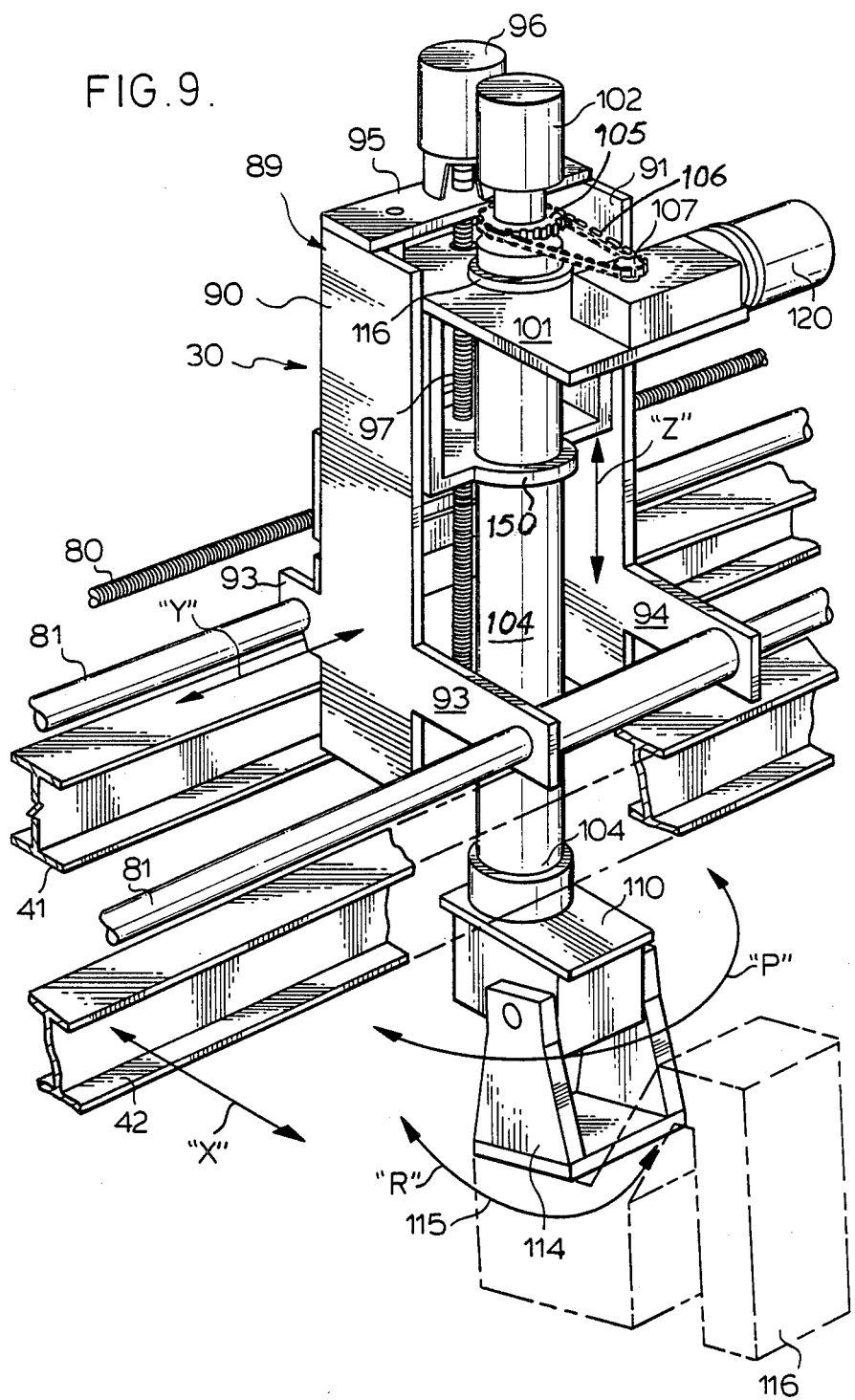
FIG. 9 is further general perspective view of a robot carriage unit in accordance with the present invention showing its relationship to a tool mount carriage.
Figure 10:
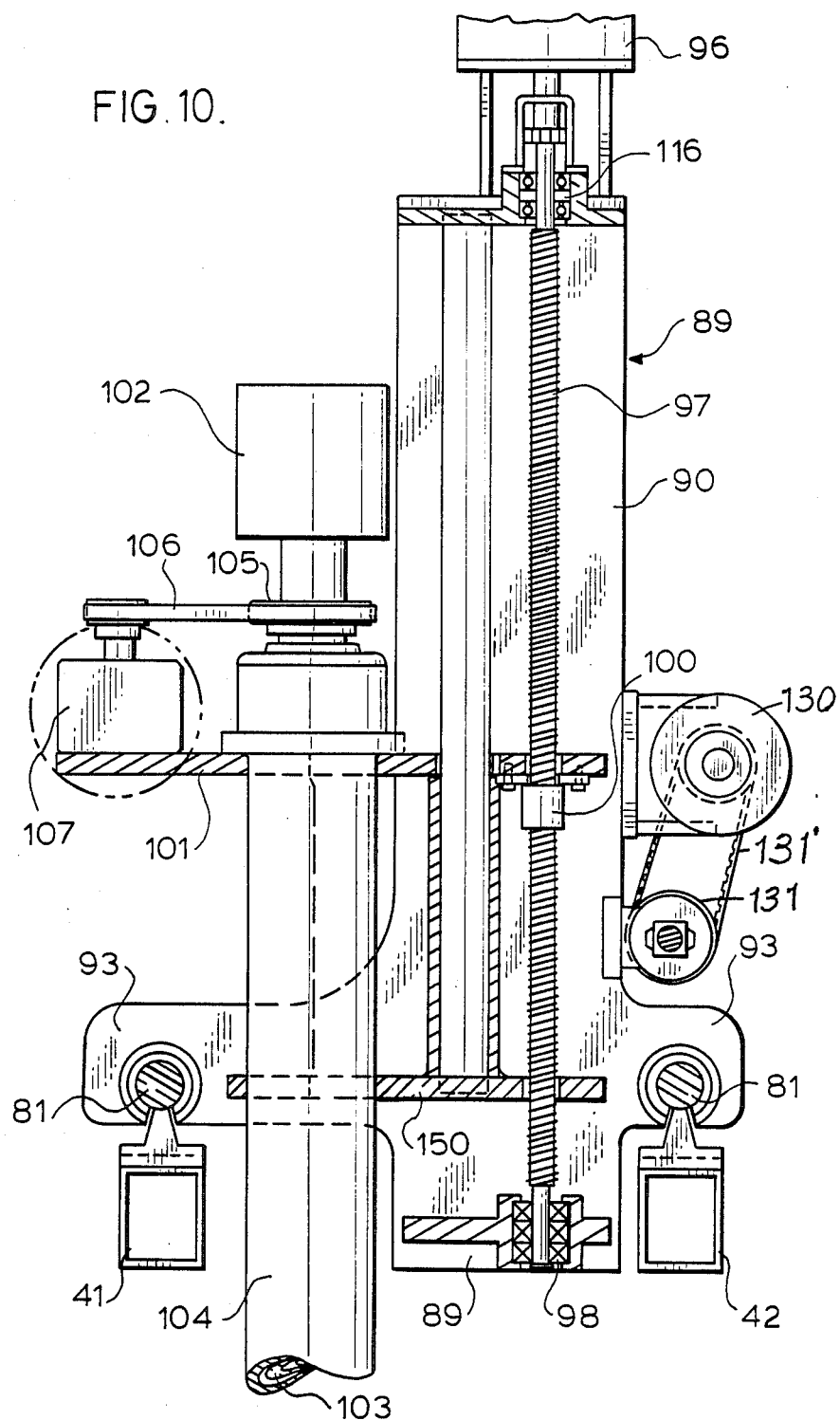
FIG. 10 is a side elevation partially in section of the unit illustrated in FIG. 9.
Figure 11:
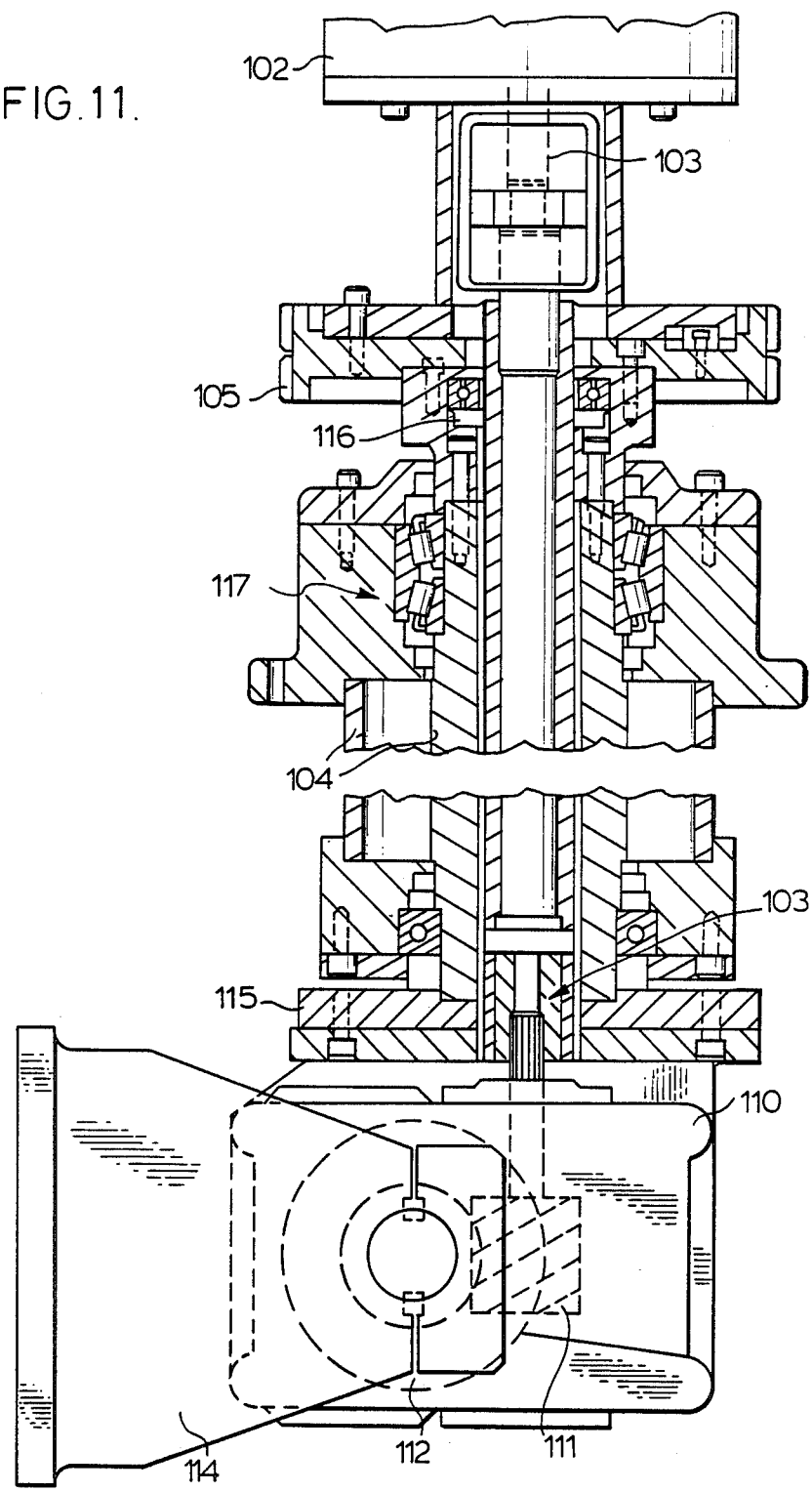
FIG. 11 is a side elevation of a robot carriage unit and serves to illustrate the mechanism for driving the tool mount through two axes.

Each robot carriage such as 71 and 72 has a structure as illustrated in FIGS. 8 through 10. As shown the carriage comprises a frame 89 with arms 93 and 94 which run on rods or guide bars 81.

A top plate 95 is mounted across the upper ends of plates 90 and 91. And on top plate 95 a motor 96 is connected to operably drive a ball crew 97 which is supported on bearings 116.

A ball nut assembly 100 engages ball screw 97 and the ball nut assembly 100 is mounted on a horizontal plate 101 so that when the motor 96 is operated plate 101 and the drives mounted thereon move vertically. It will be evident that in each of the ball nut and screw drives relative rotation of the nut or of the screw causes the ball nut to be correspondingly displaced along the respective screw.

A further motor 102 is mounted on plate 101 and is connected to drive an inner torque tube 103.

Referring to FIG. 9, an outer rotatable tube 104 is driven through motor 120, gear 107, belt 106 and gear 105. The outer tube 104 is suitably mounted on bearings (not shown) located in plates 101 and 150. And on the lower end of tube 104 a housing 110 is mounted through collar 115 to move with tube 104. The lower end of tube 103 is provided with gears 111 and 112 and these gears drive a shaft 113, a housing 110 surrounds these gears. On shaft 113, a tool mounting bracket 114 is mounted to be rotated in the direction of the arrow 120 indicated in FIG. 8.

A tool 116, shown in dotted outline in FIG. 9, is mounted on tool mounting bracket 114.

On the rear wall of frame 89 a further motor 130 is mounted and this motor is connected by drive belt 131 to a ball nut 131 which engages the ball screw 80.

It will of course be understood that each of the motors referred to is independently operable and each is operable in conjunction with one or more of the remaining motors so that as a consequence the robot tool 114 of FIG.ure 9 may be moved in the direction of the arrows and the motion in each direction because of the ball screws may be of the order of thousandths of an inch in any direction.

Figure 12:
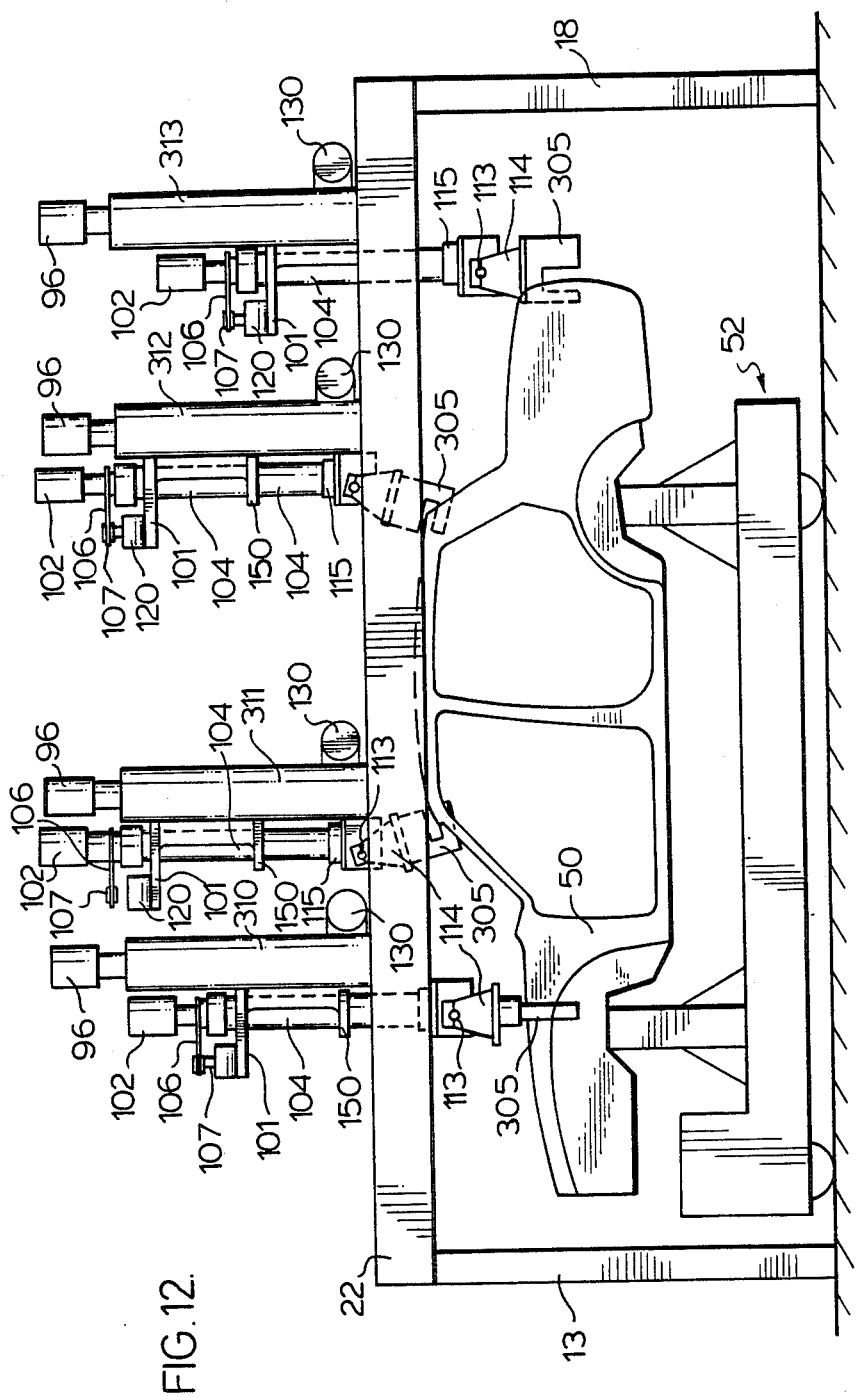
FIG. 12 is a schematic side view of a piercing station in accordance with the present invention showing only the piercing mechanisms.

FIG. 12 shows an automobile 50 upon a carriage 52 in the process of being pierced to accommodate the various fasteners for securing the further components such as doors, deck lids, bumpers and the like.

Figure 4A:
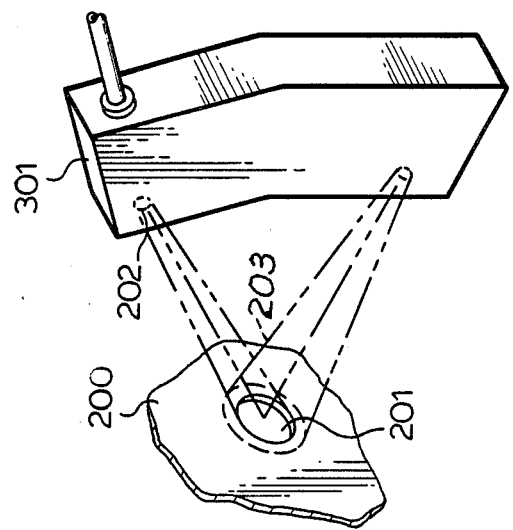
FIG. 4A is a enlarged diagrammatic perspective view of a sensing means and a reference hole on the vehicle frame showing their relationship.
Figure 4:
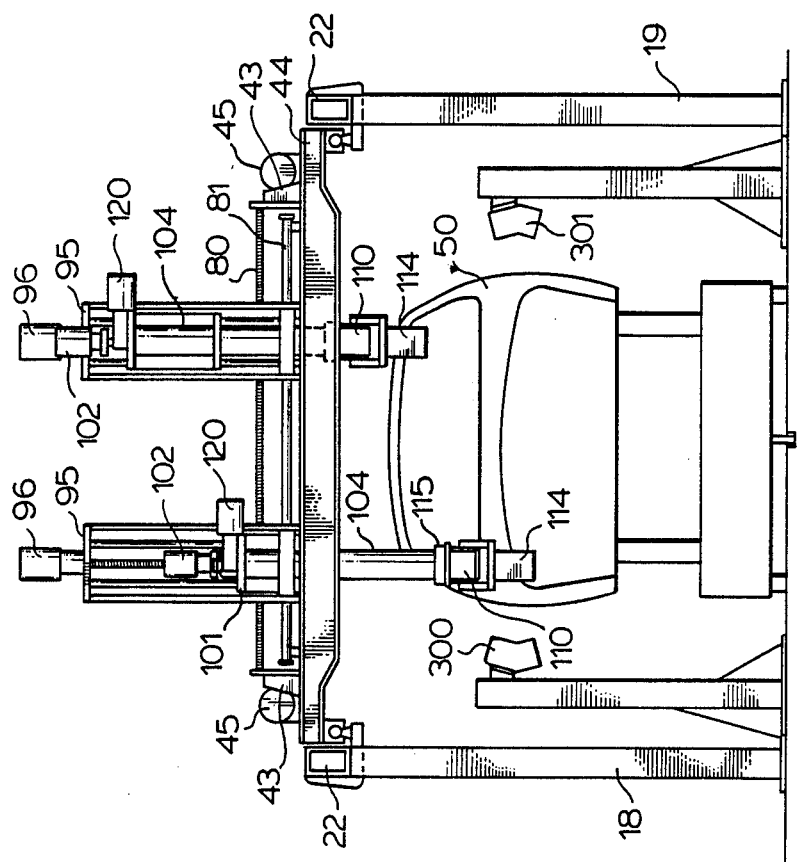
FIG. 4 is a schematic end elevation of a work station in accordance with the present invention showing the relationship of certain of the sensing means, the vehicle and the tool mounts.
Figure 5:
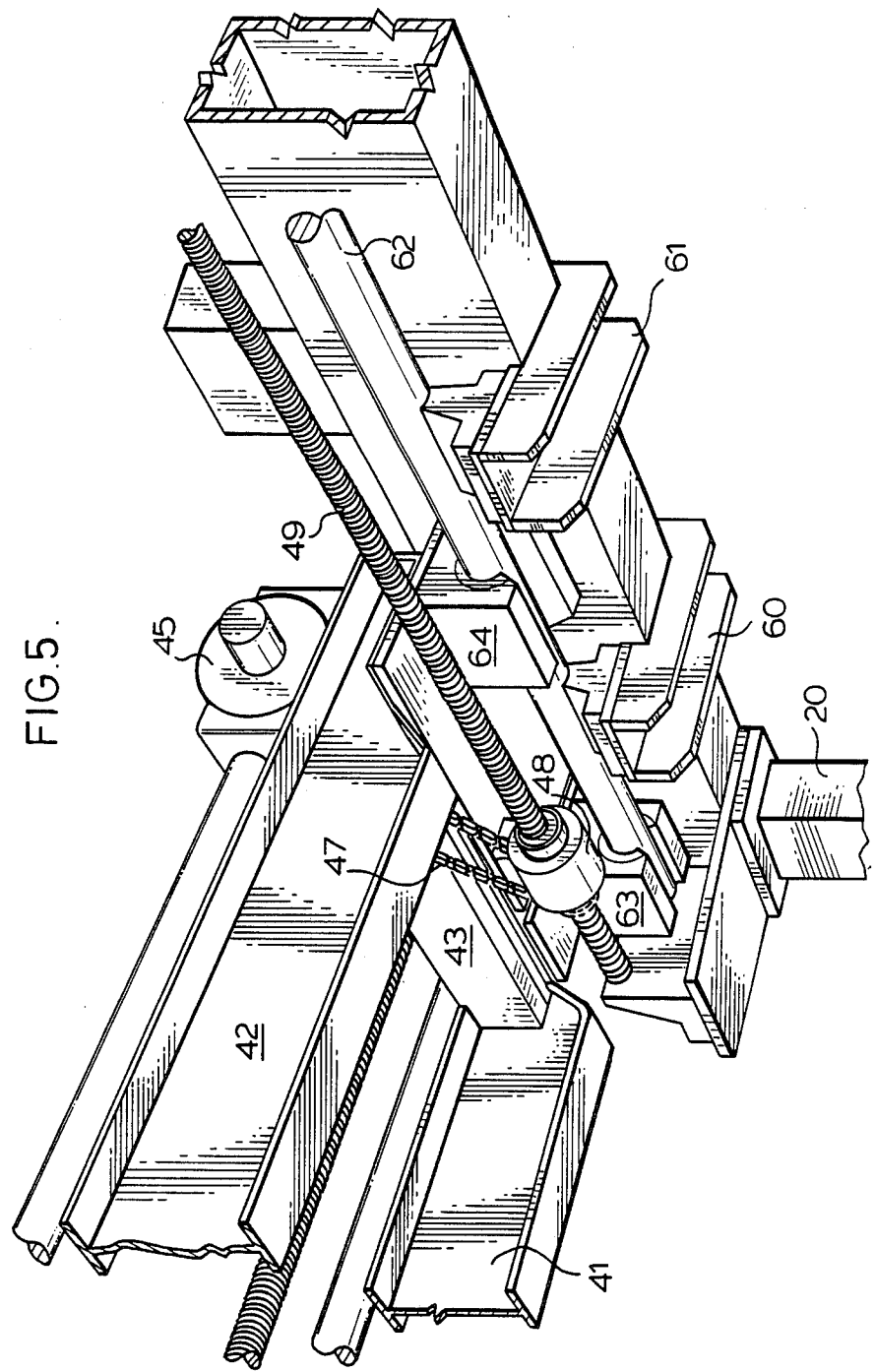
FIG. 5 is a fragmentary prespective view from the underside of a tool mount carriage and illustrates its motor mechanism and associates support structure.
Figure 6:
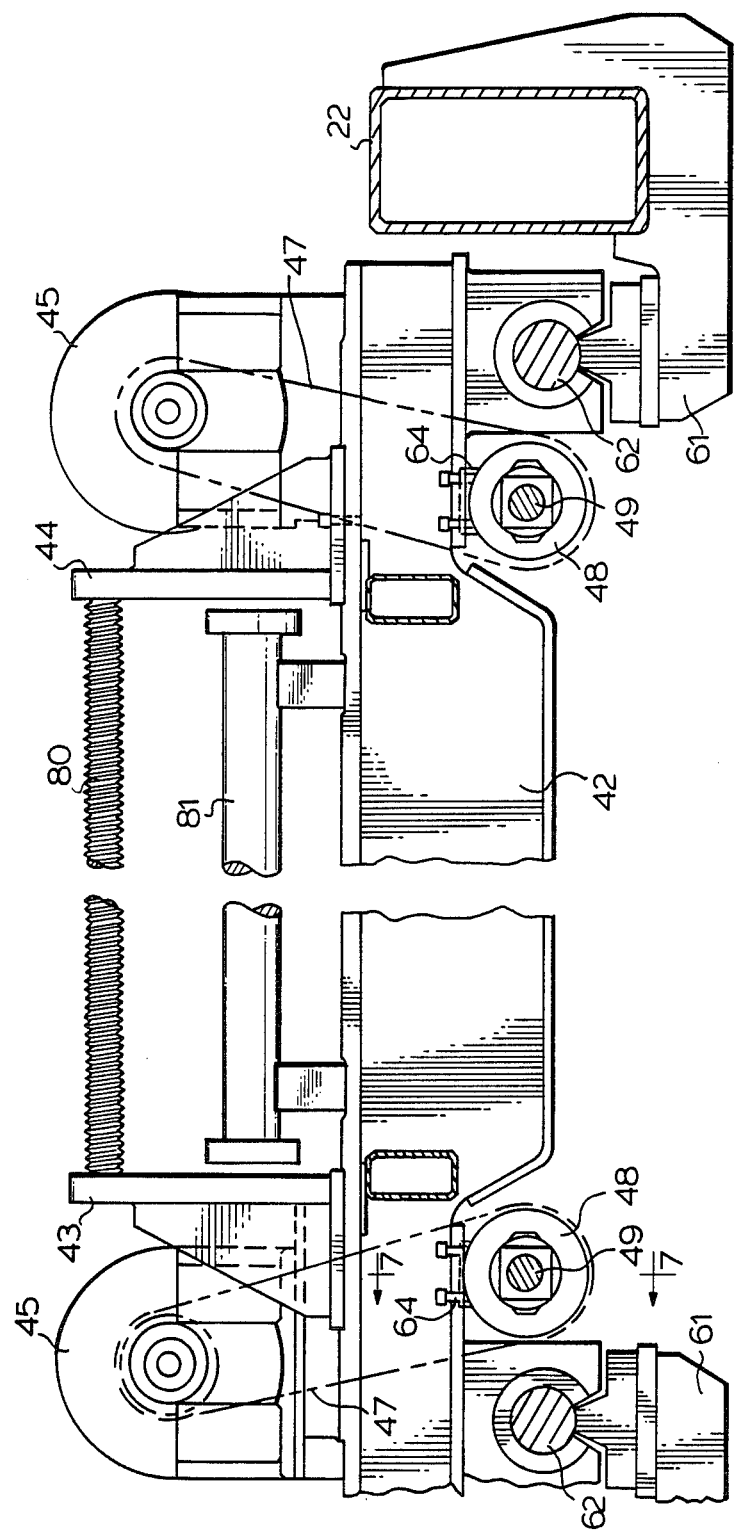
FIG. 6 is a general elevation from the front, partially broken away, of a carriage beam with its associated structure employed in the present invention.
Figure 7:
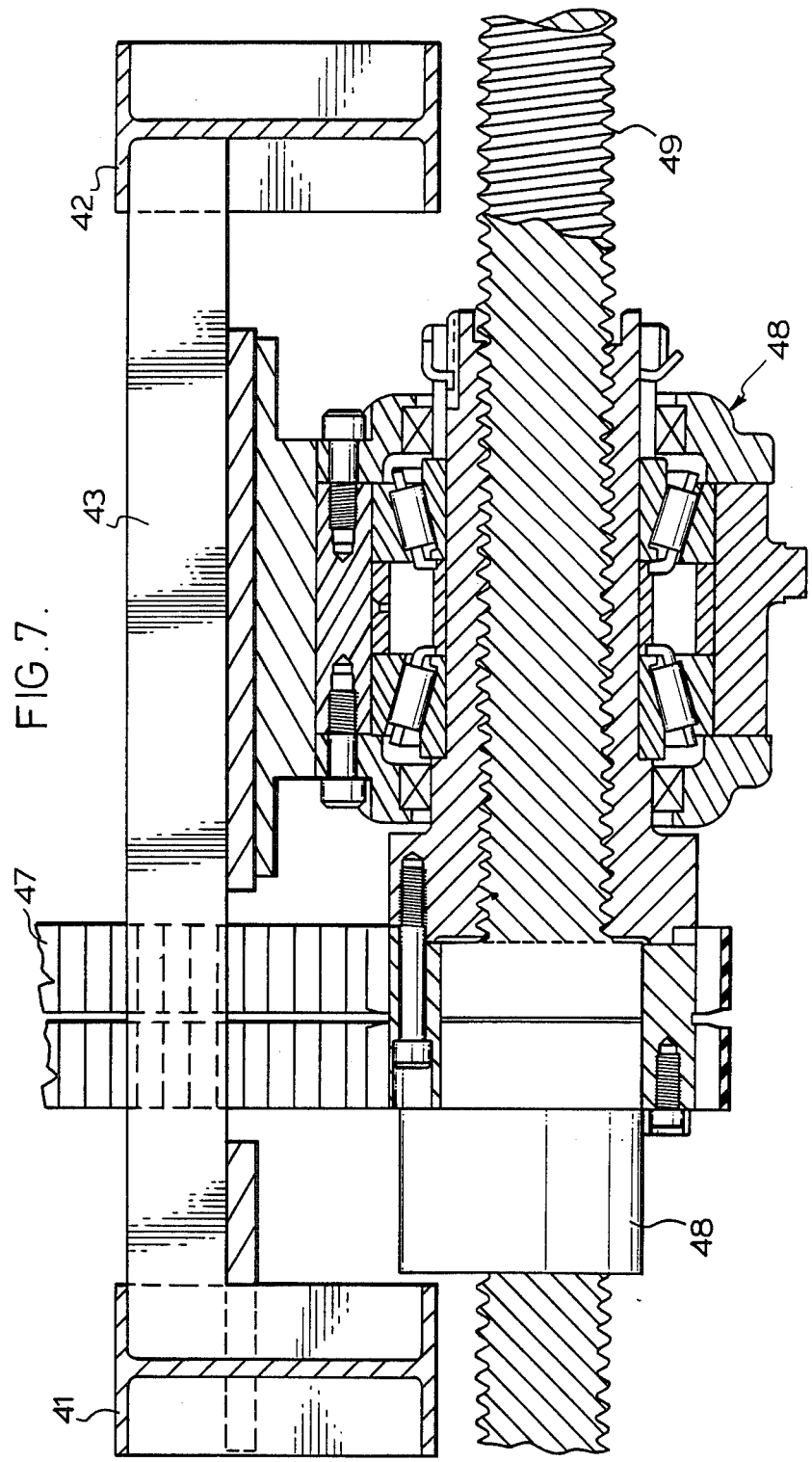
FIG. 7 is a sectional view taken along line 7—7 of FIG. 6.

In FIG. 1 the structure of 12 was generally indicated as the station 10. It has five piercing stations indicated (in FIG. 1) as 71 and 72, carried (see FIG. 12) on four bridges 310, 311, 312 and 313. In FIG. 12 only four stations are visible since bridge 313 carries two robot carriages. As the automobile 50 is moved along the track 51 on carriage 52 it is moved into a primarily acceptable location. It will be understood that each automobile is provided with a predetermined arrangement of datum holes or slots. On each side of the automobile track non-contact, triangulation based, three-dimensional optical sensors are mounted, each in programmed sensing relation to a predetermined datum feature of an automobile body mounted on the track. Two such sensors are illustrated in FIG. 4 at 300 and 301 and in FIG. 4A there is illustrated the operating principle. In FIG. 4A the area of the vehicle and the datum hole therein are indicated at 200 and 201, respectively. The imaging section of the sensor is indicated at 202 and a flashed illumination field is indicated at 203. The flashed illumination field is obtained by illuminating the selected area and is used to identify dimensional integrity on parts and assembly hole diameters, edge locations and shown deviations from a master position. Referring to FIG. 4A, the sensor 301 incorporates optical image sensing means, to focus on the programmed datum hole. Comparator means provide information on deviations of the datum hole from the programmed master position. The information thus determined is fed into a microcomputer, not shown, and the several motors on the bridges and robot carriages, are actuated to move the appropriate tool into an appropriate corrected position with an accuracy of one thousandth of an inch.

For example, in the view shown in FIG. 12 each of the tools 305 is a piercing tool which as mentioned before has a capacity to move through five dimensions. Thus when the main axis of vehicle 50 is not aligned with the main axis of the station each of the bridges and robot carriages is moved and the tool is moved to accommodate the deviation from a master position.

In those areas where the datum hole is within the outside wall of the automobile and not directly accessible from outside the automobile walls the sensors may be movable to predetermined positions as in FIG. 14 where they again perform as previously described.

In FIG. 12 the bridges carrying the robot carriages are indicated at 310, 311, 312 and 313.

When the vehicle 50 has been advanced into the principally acceptable work position, the carriage 52 is locked in the predetermined position. The sensors such as 300 or 301 for each bridge are advanced into their sensing position. They are then actuated and the position gauged and then they are retracted. The information derived is then analysed in the microcomputer and the tools are advanced simultaneously for each bridge into a position determined by the analysis. The tools are then actuated to pierce and then they are retracted to clear the car.

With bridge 310 where more than one hole may be required the piercing of each hole is accomplished in succession and similarly with bridges 311 and 312 where four holes may be required the respective carriages are moved simultaneously and successively to pierce the holes.

As illustrated in FIGS. 13 through 15 and FIGS. 16 through 18 inclusive, those stations in accordance with the present invention which have a facility for assembling components to the automobile body are each supplied with at least one accumulator such as 500 which is mounted alongside the assembly station.

Accummulator 500 comprises a frame 501 which supports upper and lower chain assemblies such as 502 and 503. These chain assemblies comprise double link chains 504 which are driven by conventional electric motors and are provided with speed reducers as required.

Figure 13:
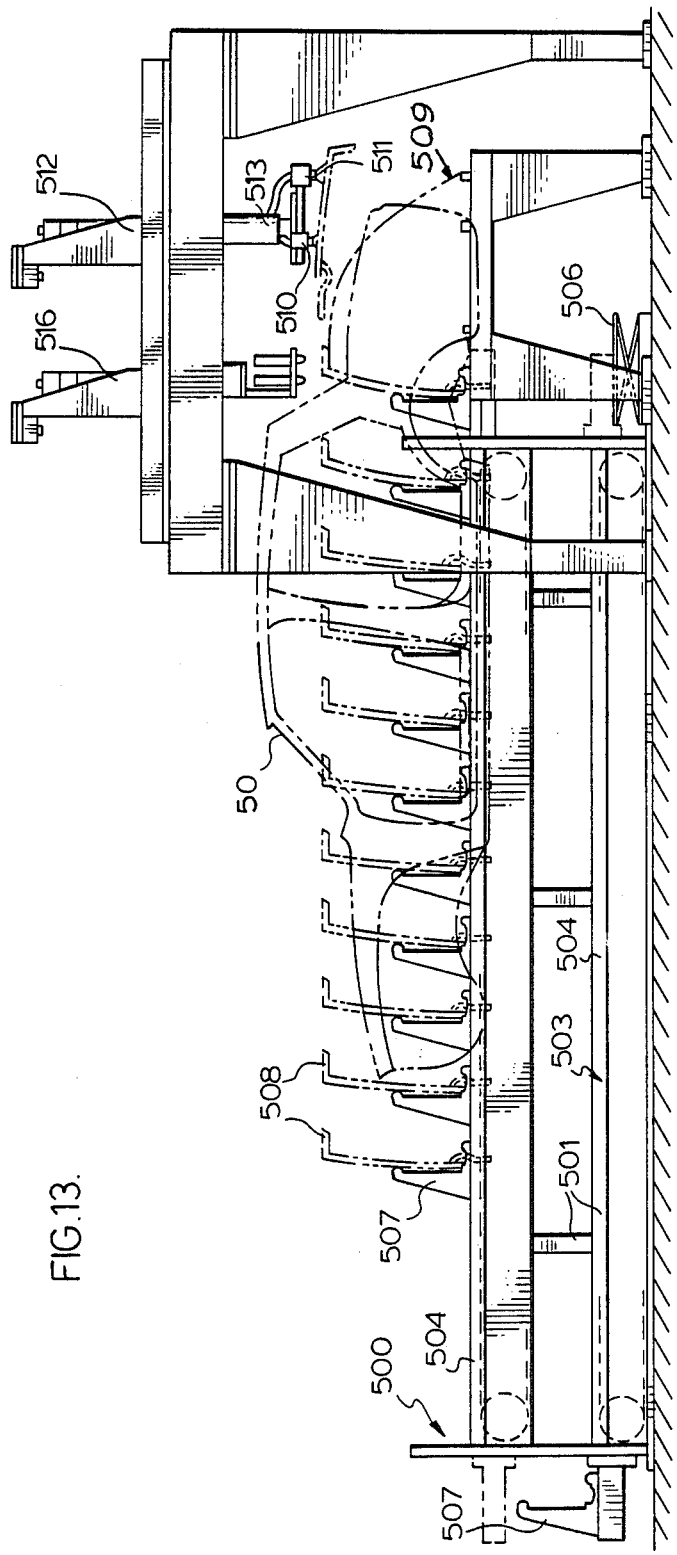
FIG. 13 is a schematic side elevation of a rear deck mounting station in accordance with the present invention without unit running, torque monitoring or gauging equipment for clarity.
Figure 14:
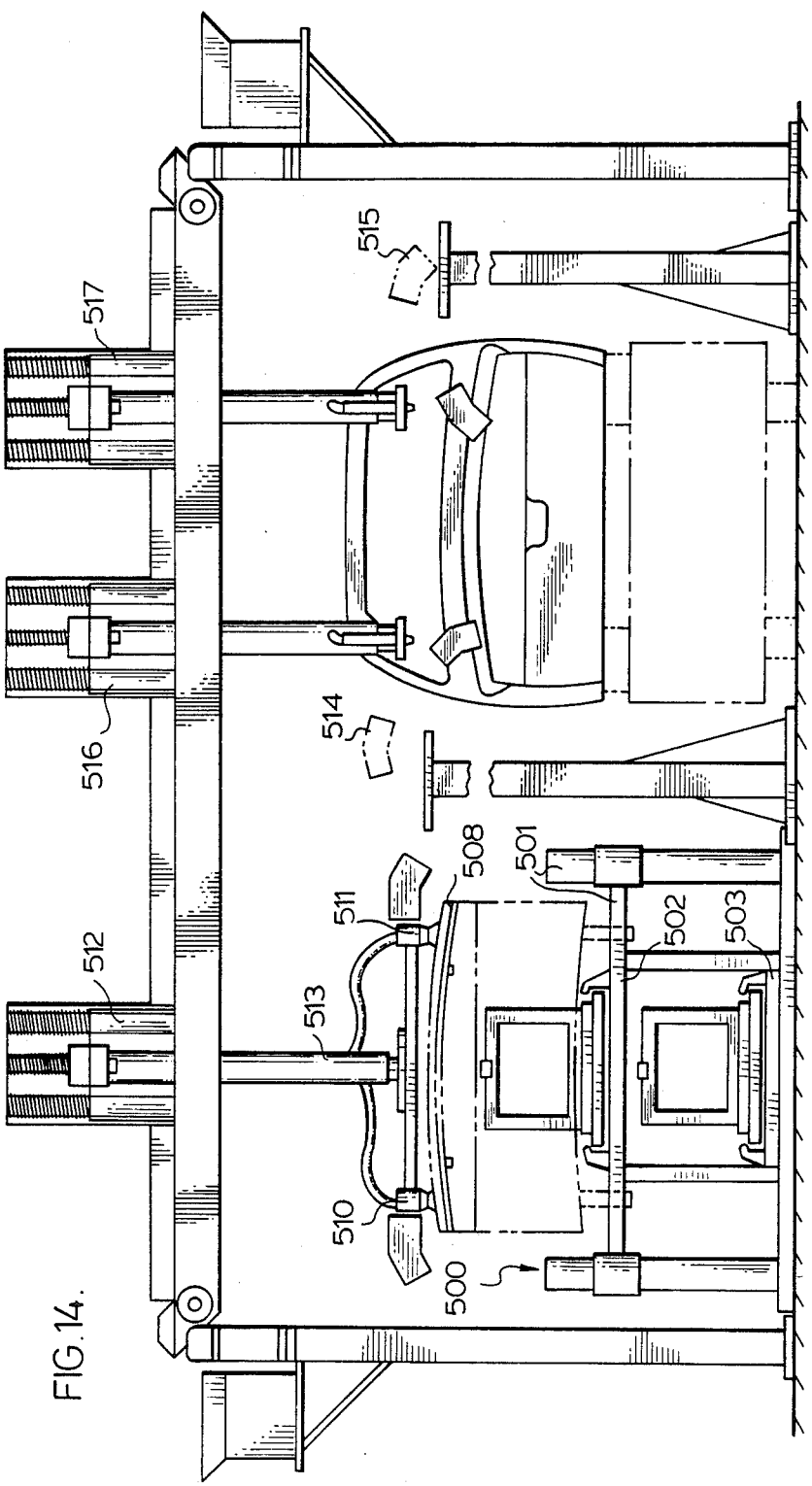
FIG. 14 is a schematic rear end elevation of the station illustrated in FIG. 13 with laser gauging equipment being illustrated schematically and serves to illustrate the method of operation of the invention.
Figure 15:
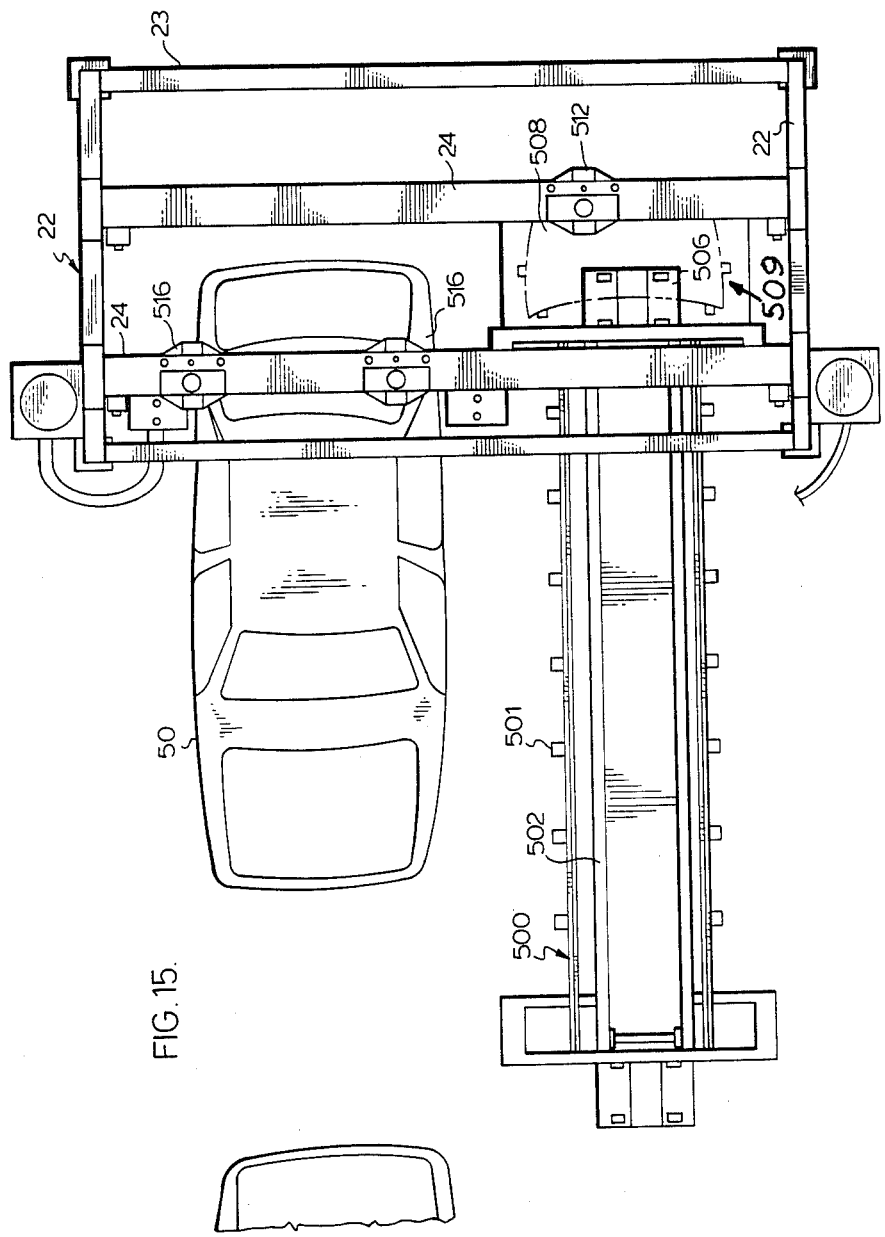
FIG. 15 is a schematic plan view of the station illustrated in FIGS. 13 and 14 and further serves to illustrate a structure in accordance with the present invention.

FIGS. 13, 14 and 15 are, respectively, a side elevation, a rear end elevation, and a plan view, of a deck lid mounting station in accordance with the present invention.

Stations 11 and 12 of FIG. 1 do not include a deck lid station as such. They illustrate the rear and front door assembly stations in accordance with the present invention, however, it will be understood that a station such as that illustrated in FIGS. 13, 14 and 15 would normally be employed in association with the remaining stations of FIG. 1.

As indicated in FIG. 13 the unloading end of the accumulator, ie. the right hand end as viewed on FIG. 13 has a pallet lowering mechanism 506 which is a scissor table and the remote end has a similar elevating mechanism.

On the double link chains 504 there are provided pallets of a configuration suitable for carrying the appropriate component. In FIG. 13 these pallets are indicated at 507. The pallets 507 are loaded with the deck lids 508, indicated in dotted outline, and then through the action of the chain links 504 the deck lids 508 are advanced along the accummulator to a transfer station 509. At 509 the deck lid is gripped and lifted by vacuum cups such as 510 and 511 mounted on tool 513 which is carried by carriage 512.

At this time the sensors 514 and 515 move from their normal dotted outline position into their operative positions, in solid outline, to gauge the car and lid positions. Then the lid position is adjusted through the microcomputer actuating the carriages 516 and 518. A second reading is taken and the deck lid position adjusted again. Then the nut runners are advanced and the bolts are tightened. The nut runners are then withdrawn and the deck lid unclamped from its tool.

Figure 16:
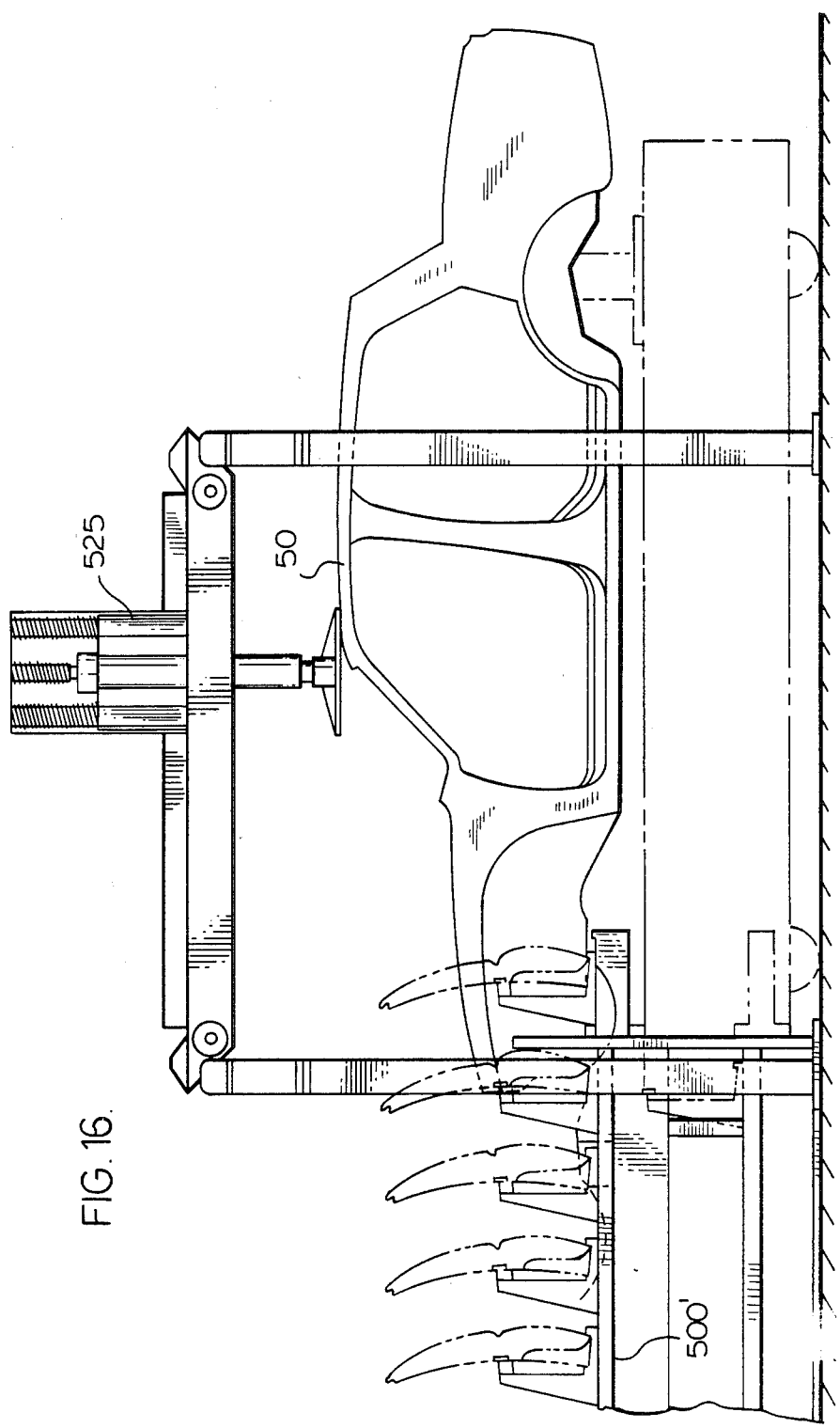
FIG. 16 is a schematic side elevation of a front door mounting station in accordance with the present invention with the unit running, torque monitoring equipment, laser gauging and door fixture omitted for clarity.
Figure 17:
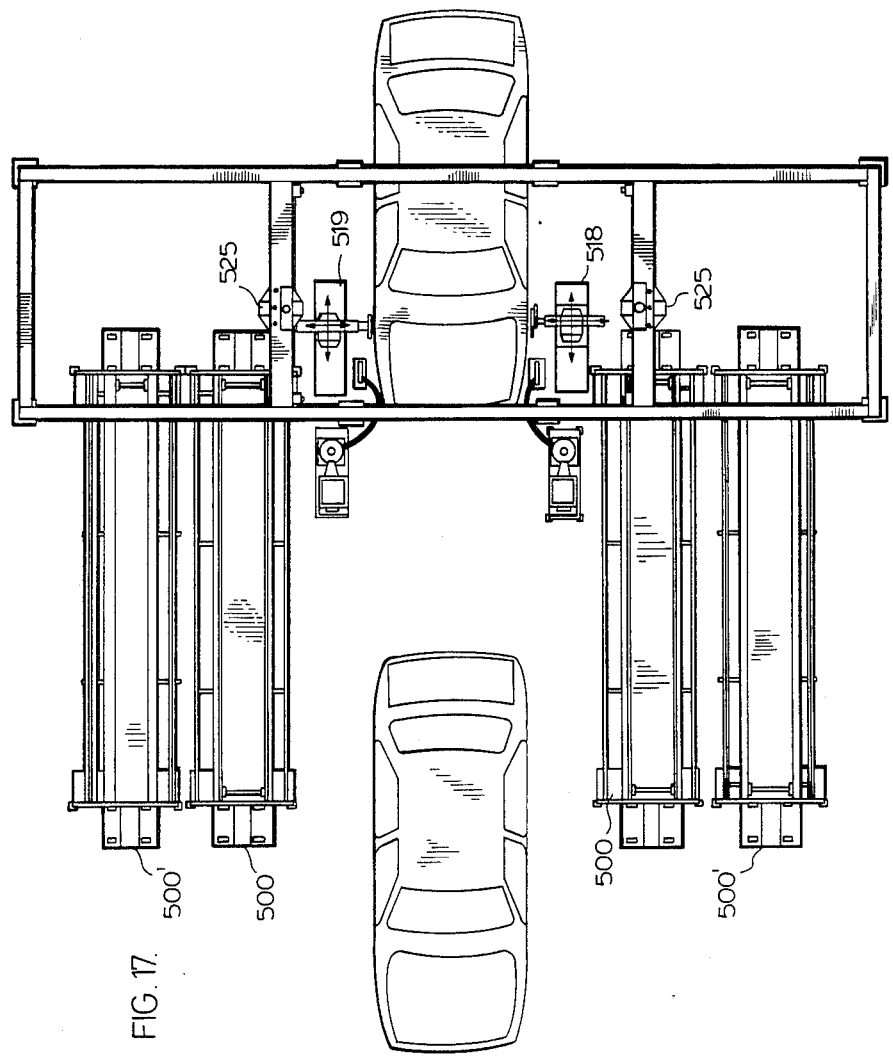
FIG. 17 is a schematic plan view of the station shown in FIG. 16.
Figure 18:
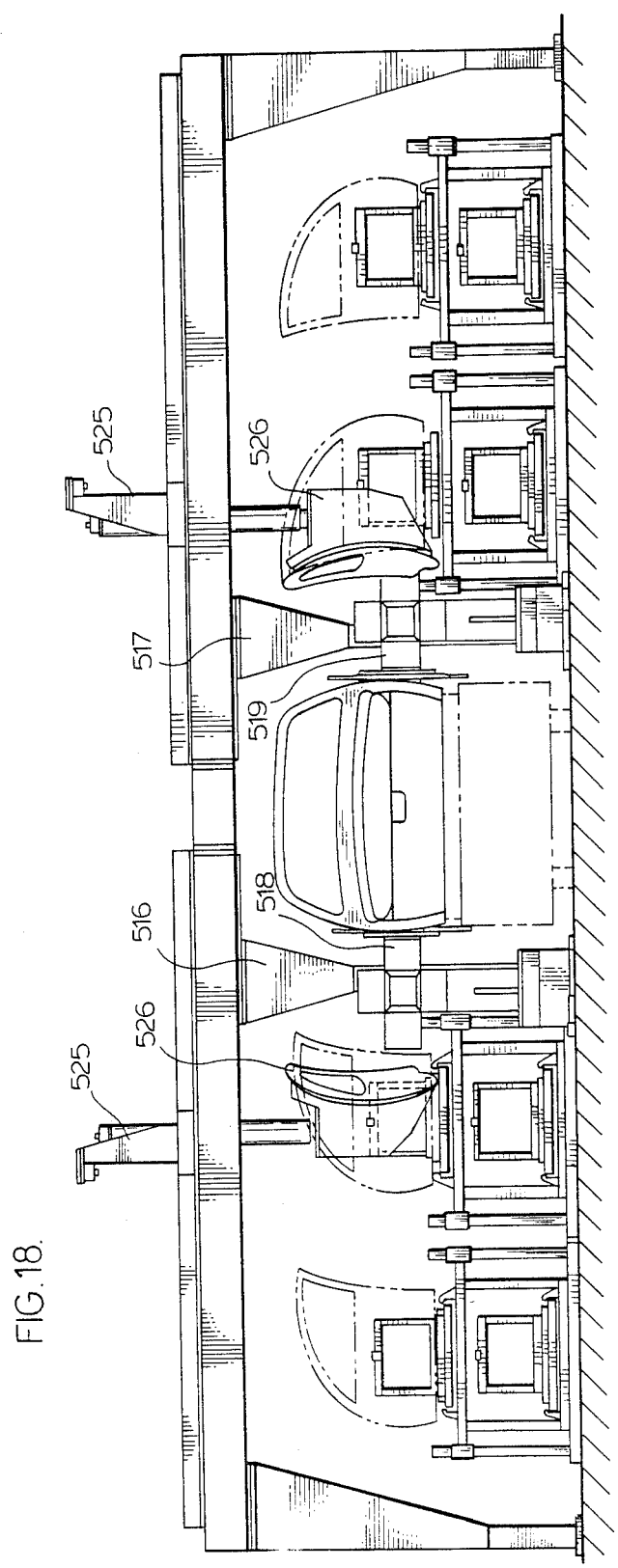
FIG. 18 is a front elevation of the station illustrated in FIGS. 16 and 17.

The stations shown in FIGS. 16 through 18 are substantially the same as those shown in FIGS. 13 through 15 although adapted to accommodate the specific components to be assembled.

Since there are twice the number of doors as deck lids, there are twice as many accummulators required to effect delivery of the doors for assembly in the same time, thus in the structures of FIGS. 16 through 18 there are two accummulators 500 and 500¹ provided on each side of the assembly station. Each of the accumulators have the same structure as described before with respect to FIGS. 13 through 15.

For consistency the outer accummulators will be indicated as 500¹ and the inner accummulators as 500.

The car 50 is advanced by the carriage 52 into the assembly position. The car is secured in this position on its carriage. The robot carriage 525 is then moved over to a position above the accummulator 50 where it picks up a door 526 through suction cups or a suitable grasping mechanism and moves through 90° and into an approximate assembly position.

The hole sensors such as 514 and 515 then determine the deviation of the holes from the master position by movement. The bridges, robot carriages and the tool mounts carrying doors are adjusted to accommodate the deviation.

The screws are then fed from nut and screw hoppers 516 and 517, inserted and driven home by the screw driving mechanisms at 518 and 519.

The automobile 50 with the mounted doors is then advanced to the next work position.

The structure of the robot carriages namely the ball and screw drives permit the mounting of plural robot carriages on one bridge, their operation independently of one another and the accuracy of infinite adjustment. The mounting of the robot carriages on the frames above the work piece and the work to be performed together with the added strength provided by the cylindrical configuration which is permitted concentric by such mounting gives the present structure the capacity to use tools which may carry up to five thousands pounds.

From the foregoing it will be apparent that the present invention provided a robotic facility which is enhanced with respect to dimensions of flexibility and strength with respect to those which have preceded.

What is claimed:

1. For use in a robotic assembly system, means for moving a tool mount through five axes, said means comprising:
   first motor means operably connected to said tool mount for rotating said mount about a first axis;
   second motor means operably connected to said tool mount for rotating said mount about a second axis normal to said first axis;
   third motor means for moving said tool mount along a third axis normal to said first axis;
   a first movable carriage on which said first, and said second motor means and said tool mount are carried;
   a second movable carriage, said first carriage being carried on said second carriage and movable relative thereto;
   means for moving said first carriage relative to said second carriage along a fourth axis inclined to said first axis;
   second carriage motor means operably connected to said second carriage for moving said second carriage along a fifth axis, said fifth axis being inclined to said first and said fourth axes; said first motor means being connected in driving relation with a first shaft, gear means connecting said first shaft to said tool mount, to drive said tool mount about an axis inclined to said first shaft; said second motor means being connected in driving relation with an elongate cylindrical member having a main axis, and surrounding said first shaft and connected in supporting relation with said tool mount, to rotate said tool mount about said cylindrical member main axis.

2. Means for moving a tool mount as claimed in claim 1 wherein said means for moving said first carriage relative to said second carriage comprises a fourth motor means mounted on said first carriage, said motor means being operatively connected to a ball screw drive extending parallel to said third axis.

3. Means for moving a tool mount as claimed in claim 1 wherein said first and second motor means are mounted on a moveable platform carriage by said first carriage and said third motor means is mounted on said first carriage, and ball screw drive means operably connecting said third motor means and said moveable platform to move said platform in response to actuation of said third motor means.

4. Means for moving a tool as claimed in claim 1 wherein said second movable carriage has a pair of opposite ends and is mounted on an elevated frame above a work piece upon which work is to be performed.

5. Means for moving a tool mount as claimed in claim 4 wherein said elevated frame includes a pair of rigid parallel members, a pair of ball screws mounted one one each of said parallel members, a pair of motor means one adjacent each end of said second movable carriage, and a pair of ball nuts being operable connected between an adjacent one of said motor means and said ball screws to move said second carriage along said screws in response to actuation of said motor means.

6. Means for moving a tool mount as claimed in claim 1 wherein said second movable carriage carries at least one of said first movable carriages.

7. Means for moving a tool mount as claimed in claim 1 wherein said second movable carriage carries a plurality of said first movable carriages each of said first movable carriages being movably independent of each of said remaining first movable carriages.

8. Means for moving a tool mount as claimed in claim 1 wherein said first movable carriage is movable vertically relative to said second carriage, said elongate cylidnrical member being rotatably supported by said first carriage for rotation about said main axis.

9. Means for moving a tool mount as claimed in claim 8 said third motor means being connected by a ball nut and screw to said first movable carriage, in vertical positioning relation therewith.

10. Means for moving a tool mount as claimed in claim 1, said gear means connecting said first shaft to said tool mount being supported at the end of said elongate cylindrical member and comprising a worm gear, connected in driven relation with said first shaft to drive said tool mount about an axis extending normally to said first shaft.

* * * * *